United States Patent
Gudmundsson et al.

(10) Patent No.: US 9,418,136 B1
(45) Date of Patent: Aug. 16, 2016

(54) METHOD AND SYSTEM FOR MATCHING DESCRIPTIVE TEXT FOR A MULTIMEDIA CONTENT IN A VENDOR'S CATALOG WITH DESCRIPTIVE TEXT FOR A MULTIMEDIA CONTENT IN MEDIA STORE'S CATALOG

(75) Inventors: Agust Kr. Gudmundsson, Hackettstown, NJ (US); Jayesh Supe, Somerset, NJ (US); Sajid Ahmed, Monmouth Junction, NJ (US); Mary P. Jelinek, East Windsor, NJ (US); Adil S. Belihomji, Kendall Park, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 1135 days.

(21) Appl. No.: 12/415,363

(22) Filed: Mar. 31, 2009

(51) Int. Cl.
*G06F 7/00* (2006.01)
*G06F 17/00* (2006.01)
*G06F 17/30* (2006.01)

(52) U.S. Cl.
CPC ................................ *G06F 17/30592* (2013.01)

(58) Field of Classification Search
USPC ............................ 707/E17.009, 999.107, 600
See application file for complete search history.

(56) References Cited

U.S. PATENT DOCUMENTS

| | | | | |
|---|---|---|---|---|
| 6,092,080 | A * | 7/2000 | Gustman | |
| 6,125,388 | A * | 9/2000 | Reisman | 709/218 |
| 7,516,142 | B2 * | 4/2009 | Friedlander et al. | 705/7.11 |
| 2002/0042794 | A1 * | 4/2002 | Konaka | 707/6 |
| 2005/0055372 | A1 * | 3/2005 | Springer et al. | 707/104.1 |
| 2006/0259434 | A1 | 11/2006 | Vilcauskas, Jr. et al. | |
| 2007/0168462 | A1 | 7/2007 | Grossberg et al. | |
| 2007/0173236 | A1 | 7/2007 | Vishwanathan et al. | |
| 2007/0203845 | A1 * | 8/2007 | Gross et al. | 705/59 |
| 2007/0232223 | A1 | 10/2007 | Bilange | |
| 2008/0092168 | A1 * | 4/2008 | Logan et al. | 725/44 |
| 2008/0104246 | A1 | 5/2008 | Katz et al. | |
| 2008/0133569 | A1 | 6/2008 | Vu et al. | |
| 2008/0159522 | A1 | 7/2008 | Ericson | |
| 2008/0189395 | A1 | 8/2008 | Stremel et al. | |
| 2008/0215319 | A1 | 9/2008 | Lu et al. | |

* cited by examiner

*Primary Examiner* — Alex Gofman
*Assistant Examiner* — Muluemebet Gurmu

(57) ABSTRACT

A media store server offers access to multimedia contents available from servers of one or more vendors. The media store server provides customers' digital information devices with catalog of content offered through the media store server. To provide a unified catalog for the store, the media store server retrieves a first descriptive text for a multimedia content in a catalog of vendor's server. The first descriptive text is converted into a second descriptive text representing the multimedia content, which is in a standardized format required for the media store server catalog. The second descriptive text for the multimedia content is compared with the descriptive texts of multimedia contents in the media store server catalog. The first descriptive text for the vendor's multimedia content is stored in the catalog of the media store server, if the second descriptive text for the multimedia content matches with any of the descriptive texts of multimedia contents in the catalog of the media store server. The stored first descriptive text provides a link to or association for access to the actual file on the vendor's server, i.e. so when users searches, the text comes up from the store server and selection enables user to access/download multimedia content from the vendor's server.

23 Claims, 7 Drawing Sheets

MEDIA STORE

| ARTISTS | GENRE | SEARCH | TOP HIT |

SEARCH RESULT

|    | TYPE     | TITLE            | ARTIST | ALBUM/COLLECTION | PRICE  |
|----|----------|------------------|--------|------------------|--------|
| 01 | MOD      | BEAUTIFUL        | A      | VARIOUS          | $ 2.99 |
| 02 | RINGTONE | BEAUTIFUL        | B      | SUSPICIOUS       | $ 3.99 |
| 03 | RINGTONE | BEAUTIFUL SUNDAY | C      | ALL              |        |
| 04 | RINGBACK | BEAUTIFUL        | A      | BEST HIT         |        |
| 05 | RINGBACK | BEAUTIFUL WOMAN  | D      | ALL LOVE SONG    |        |

FIG. 1

METHOD AND SYSTEM FOR MATCHING DESCRIPTIVE TEXT FOR A MULTIMEDIA CONTENT IN A VENDOR'S CATALOG WITH DESCRIPTIVE TEXT FOR A MULTIMEDIA CONTENT IN MEDIA STORE'S CATALOG

FIELD OF THE INVENTION

The present subject matter relates to a method and a system for matching a descriptive text for a multimedia content in a catalog of multimedia content vendor's server with a descriptive text for a multimedia content in a catalog of a media store server, where the store server for example may offer searching and/or purchasing of content that actually resides in one or more vendors' servers.

BACKGROUND

Wireless communication devices, such as mobile handsets, pagers and other two-way messaging devices, have had the capability to receive data and/or voice from the wireless communication system. Besides this basic wireless communication functionality, other technical achievements have been integrated onto the wireless communication devices. In recent years, as the speeds of wireless communication equipments and the speed of processors increase, the wireless communication devices have been provided with complete Internet access via web browsers or application software tailored to the wireless communication. As the wireless communication devices have advanced so as to serve as players for listening to music and viewing videos, the downloading of music and video to wireless communication devices has become widespread.

To meet needs for downloading music and video, a lot of music and video vendors provide websites through which the wireless communication device users can download music (including ringtones and ringback tones) and video over the air into the communication devices. The vendors' websites provide catalogs, which categorize music and video e.g. according to artists (directors or actors), albums or titles, in various ways, for the wireless communication device users to conveniently search and find their desired music or video. Since the vendors' catalogs, however, have different formats with each other, even the same music of the same artist is represented by different textual identifications in the vendors' catalogs. A similar problem may arise even within one catalog, if one item appears in multiple forms (e.g. MP3 audio, MPEG video and/or ringtone) if the textual identifications are inconsistent.

On the other hand, wireless communication service providers provide media platforms from which the wireless communication device users buy and download diverse music and video from the plurality of vendors and/or from the wireless communication service providers. The music or the like bought from the media platform may be downloaded onto the wireless communication devices via the wireless network directly, and be downloaded to the PCs via the landline network, in which, thereafter, the downloaded music in the PCs are transferred to the wireless communication devices via wireless or wired cables. The media platforms need to provide catalogs of music and video, which categorize music and video according to artists (directors), albums and titles and pull together diverse versions of the same music and video, for convenience of wireless communication device users in searching and finding their desired music and video. It has been proposed that one service provider, e.g. a wireless service provider, might offer a "store" that offers collective access for searching and possibly purchasing of content files. Although some content may reside on the store's server, many of the actual content files reside on any number of other vendors' servers. However, since the vendors' catalogs have different formats and different descriptive texts for title or track and artist names from each other, it is difficult to categorize music and video and pull together diverse versions of the same music or video from plural vendors' catalogs, particularly to provide a comprehensive unified catalog for the multimedia store.

Hence, a need exists for a method and a system that finds and matches the same music and video from their diverse versions in one or more vendors' catalogs, categorize the diverse versions of the same music and video in the media platform according to artists (directors), album, or title, and allow multimedia content in a manner that is the catalog to be used more effectively in searching and downloading conveniently to the users.

Another need exists for piecing together and categorizing a list of music and video or the like from plural vendors' catalogs according to artists (directors), album, or title and providing a harmonized catalog to wireless communication device users.

SUMMARY

The teachings herein address one or more of the above noted needs relating to a method and a system for matching a descriptive text of a multimedia content in a catalog of multimedia content vendor's server with a descriptive text of a multimedia content in a catalog of a server for a media store.

The teachings below encompass a method for matching a first descriptive text for a multimedia content in a catalog of multimedia content vendor's server with descriptive texts for multimedia contents in a catalog of a media store server. The media store server provides customers' digital information devices with the catalog of the media store server. The media store server retrieves the first descriptive text for the multimedia content in a catalog of vendor's server. The first descriptive text for the multimedia content in the catalog of the vendor's server is converted into a second descriptive text of the multimedia content, which was standardized format required by the catalog of the media store server. The second descriptive text for the multimedia content is compared with the descriptive texts of multimedia contents already listed in the catalog of the media store server. The first descriptive text for the multimedia content in the catalog of the vendor's server is stored in the catalog of the media store server, if the second descriptive text for the multimedia content matches with any of the descriptive texts of multimedia contents in the catalog of the media store server.

The second descriptive text may be converted to a third descriptive text of the multimedia content by decreasing number of characters of the second descriptive text, if the second descriptive text of the multimedia content does not match with descriptive texts for multimedia contents in the catalog of the media store server. The third descriptive text for the multimedia content is compared with the descriptive texts of multimedia contents in the catalog of the media store server of which number of characters are decreased as same as the third descriptive text. The first descriptive text for the multimedia content of the catalog of the vendor's server is stored in the catalog of the media store server, if the third descriptive text for the multimedia content matches with descriptive texts of multimedia contents in the catalog of the media store server.

In a practical example, the multimedia contents include music, video and game application files, and the descriptive texts include items like track information, performer and artist names, and title, and actor and director names.

The storing of the descriptive text of the multimedia content in the media store server's catalog may include replacing the descriptive text of the multimedia content in the catalog of the vendor's server with the descriptive text of multimedia of the vendor's server corresponding to the matched first descriptive text.

Another aspect of the disclosure encompasses a system for forming a multimedia content catalog of a multimedia store platform. Multimedia contents are downloaded into mobile handsets via transactions of multimedia contents on the multimedia store platform. The system comprises a media store server and a multimedia content vendor's server. The media store server provides the multimedia store platform, which is a user interface for access the media store server, to digital devices of customers including the mobile handsets upon request of the digital devices. The media store server stores a first multimedia content catalog including categorized descriptive texts for multimedia contents. The media store platform enables customers transactions of the multimedia contents. The multimedia content vendor's server provides a descriptive text for a multimedia content in a second multimedia content catalog, to the media store server and stores the multimedia content to be downloaded to mobile handsets.

The media store server converts the descriptive text for the multimedia content in the second multimedia content catalog of the vendor's server into a first descriptive text of the multimedia content. The store server compares the first descriptive text for the multimedia content with descriptive texts in the first multimedia content catalog, and stores the descriptive text of the multimedia content of the second catalog of the vendor's server in the first catalog of the media store server when the first descriptive text of the multimedia content matches with descriptive texts in the first multimedia content catalog.

The descriptive text for the multimedia content is converted to the second descriptive text by decreasing number of characters of the first descriptive text, if the first descriptive text for the multimedia content does not match with descriptive texts in the first multimedia content catalog. The second descriptive text for the multimedia content is compared with the descriptive texts in the first multimedia content catalog. The matched descriptive text for the multimedia content is stored in the second multimedia content catalog of the vendor's server onto the first multimedia content catalog when the second descriptive text of the multimedia content matches with descriptive texts in the first multimedia content catalog.

In a practical example, the multimedia contents include items like music, video and game application files, and the descriptive text includes track, performer and artist names, and title, actor and director names.

Another aspect of the disclosure encompasses unique software implementing the process for matching a descriptive text for a multimedia content in a catalog of a vendor's server with a descriptive text for the multimedia content in a catalog of a media store's server. A software product, in accord with this concept, includes at least one machine-readable medium and information carried by the medium. The information carried by the medium may be executable program code, one or more databases and/or information regarding the matching process. By execution of the software, the first descriptive text for the multimedia content in the catalog of the vendor's server is converted into a second descriptive text for the multimedia content, which is standardized format required by the catalog of the media store server. The second descriptive text for the multimedia content is compared with the descriptive texts of multimedia contents in the catalog of the media store server. The first descriptive text for the multimedia content in the catalog of the vendor's server is stored in the catalog of the media store server, if the second descriptive text for the multimedia content matches with any of the descriptive texts of multimedia contents in the catalog of the media store server.

The second descriptive text is converted to a third descriptive text of the multimedia content by decreasing number of characters of the second descriptive text, if the second descriptive text for the multimedia content does not match with descriptive texts for multimedia contents in the catalog of the media store server. The third descriptive text for the multimedia content is compared with the descriptive texts of multimedia contents in the catalog of the media store server of which number of characters are decreased as same as the third descriptive text. The first descriptive text for the multimedia content of the catalog of the vendor's server is stored in the catalog of the media store server, if the third descriptive text for the multimedia content matches with descriptive texts of multimedia contents in the catalog of the media store server.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTIONS OF DRAWINGS

The following detailed description of the embodiments of the present disclosure can best be understood when read in conjunction with the following drawing figures that depict concepts by way of example, not by way of limitations. In the figures, like reference numerals refer to the same or similar elements.

FIG. 1 illustrates an example of a page from a catalog of music and related multimedia content provided by a media store platform on a wireless communication service provider's website.

DETAILED DESCRIPTION

Figure 2:
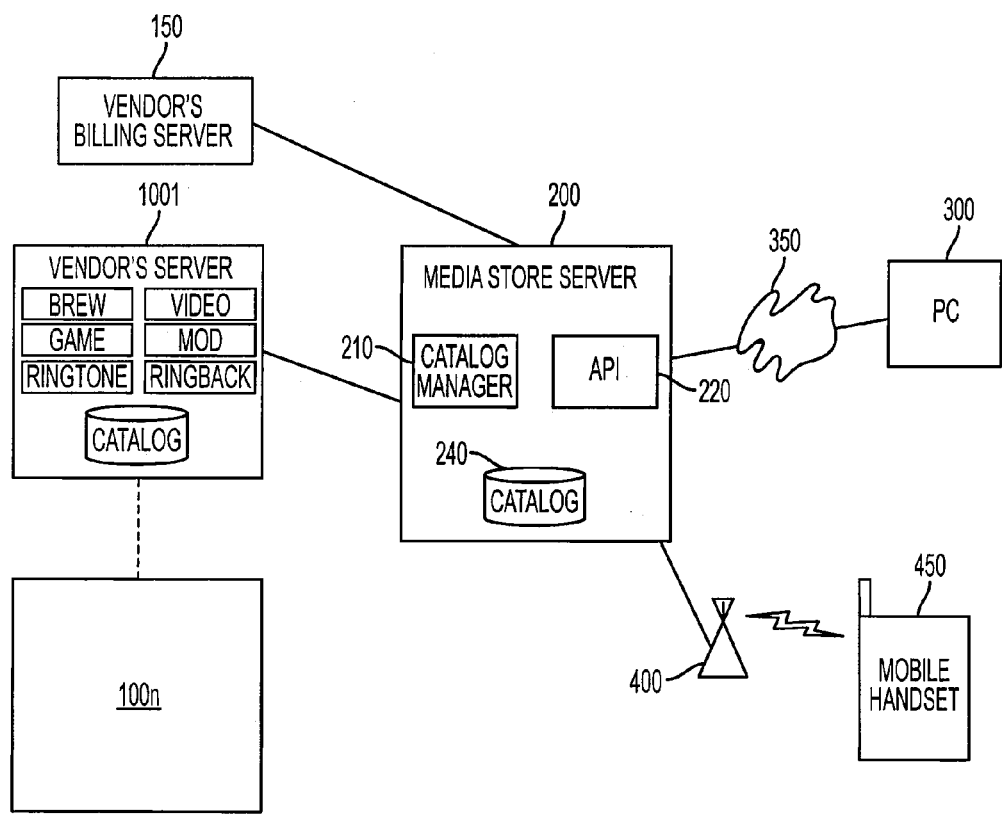
FIG. 2 is a diagram of system for implementing a media store platform managed by a wireless communication service provider that mediates selling and buying of music and/or other multimedia content between vendors' servers and mobile handset users (or PC users).

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The present subject matter encompasses a method that matches descriptive texts of multimedia content, e.g. music or video of plural vendors' catalogs with descriptive texts, such as track, artist and album names of music in a media store server catalog and provides a more exact and updated catalog for the media store server. This allows music and video to be effectively categorized in the media store catalog according to artists, performers and albums (collections), etc. Users, who want to download music or the like onto their mobile handsets directly via the wireless network or indirectly via the landline network, can lookup, search and download their desired music conveniently. Multiple related content items, e.g. related to the same song title or to the same performer, can be efficiently collected and presented by the store to the user, for selection and purchase.

FIG. 1 is an example of a page of a media store platform on a wireless communication service provider's website. The media store platform is an interface for users accessing a media store server 200 via PCs 300 (or mobile handsets 450) to search catalog in the media store server, and purchase and request to download music, or the like. The media store platform provides users with various functionalities required for purchasing and downloading multimedia contents including music, video or the like. The exemplary media store platform provides various menus such as "ARTISTS," "GENRE," "TOP HIT," of which selection allows the users to look up grouped lists of music based on artists, genre, and top hit music by users, and menu "SEARCH," selection of which permits the users to search their desired music in catalog of the media server 200. Although shown as a fairly simple text and table listing page for convenience of description and illustration, a typical page today would more likely include more sophisticated graphical and/or audio presentations. Also, for purposes of an example, we will assume that the catalog relates to music, although other general types of content such as movies or TV programs could be offered instead or in addition to the 'music' related store content.

The exemplary page displays a search result in the catalog based on an exemplary search term "Beautiful," which is inputted via selection of the menu "SEARCH" by the user. The search result displays description of music related content including term "Beautiful," i.e. "Beautiful," "Beautiful Sunday," and "Beautiful Woman." The music identified by "Beautiful" includes diverse versions of the music entitled, "BEAUTIFUL" performed by different artists "A, B," and collected in different albums/collections "Various, Suspicious and Best Hit." The search result also illustrates Ringtone, Ringback Tone and Music On Demand (MOD) types, versions of the song "Beautiful." The listed versions of the music "Beautiful," "Beautiful Sunday," and "Beautiful Woman" can be obtained from plural music vendors databases or at the store service provider's database. The media store platform may be provided at a wireless communication service provider's website in the HTML form appropriate for accessing via personal computers or laptops and may also be provided at hand-held wireless communication devices in the application interface tailored to wireless communication devices.

Since the media store platform provides a catalog, which categorizes diverse versions of the music according to genre (menu "GENRE"), artists (menu "ARTISTS"), and diverse categories, the users can conveniently find and download a specific desired version of his or her desired music via the multimedia store. To categorize music according to genre, artists or the like and to provide search function in the media store platform, the wireless communication service provider has to find and match diverse versions of textual information referencing, indexing or otherwise describing the music from vendors' catalogs, in this example, based on textual information including artists, albums and titles in the vendors' catalogs. The service provider's process to find and match music from vendors' catalogs will be described later, e.g. with reference to FIG. 6.

FIG. 2 is a system for implementing a media store platform managed by a wireless communication service provider that mediates selling and buying of multimedia content (e.g. music) between vendors' servers and mobile handset users. A plurality of vendors' servers $100_1$~$100n$ store and sell music related content including Ringtones, Ringback tones, and MP3 music, music videos and music related games; and a plurality of mobile handset users buy and download the music, video and games or the like onto the their mobile handsets 450. The media store server 200 provides a media platform, an interface implemented in a form of webpage accessible by personal computers or in a form of application installed in the mobile handsets 450; and the mobile handset users buy and download the music provided by the vendors' servers onto their mobile handsets 450. While the mobile handset users access the media store platform and buy the music cataloged therein, actual downloading of music may be performed via a wireless network between the mobile handset 450 and the vendors' servers $100_1$~$100n$ without involvement of the media store platform in the handling of the actual content.

Hence, in the illustrated music store example, vendors' servers $100_1$~$100_n$ store music including Ringtones, Ringback tones and music on demands (MOD), videos and game software to be transferred to the wireless network upon request of the mobile handset 450. Vendors' servers $100_1$~$100_n$ employ an application for easy interfacing with the media store platform in sending and receiving data such as information on catalog and textual identification of music and video without needing to code for system interface or understand wireless applications. For example, BREW (Binary Runtime Environment for Wireless) developed by Qualcomm may be used, which is a software platform that can download and run small programs for sending messages, and sharing multimedia data (photos, video, music) without needing to code for system interface or understand wireless applications. Vendors' servers $1001$~$100n$ also store their own catalogs, which are respective categorized lists of music, video, etc. according to titles, artists (directors, performers) and albums (collections). Vendors' catalogs have diverse versions of descriptions for even the same music with each other, because titles and artist names are variously represented by different texts associated with different content files.

The media store server 200 provides the media store platform to the vendors and the mobile handset users in the form of HyperText Markup Language (HTML) type webpages accessible by PCs and mobile handsets or a handset-imbedded application specifically tailored to the mobile handsets. The media store server 200 has a catalog manager 210 to obtain (and search) various catalogs from the plurality of vendors' servers $100_1$~$100_n$ and optimize the obtained catalogs to produce a catalog for the media store platform. The media store server 200 is also implemented with an application programming interface (API) 220, which is composed of functionalities interfacing with the vendors' and mobile handset users' activities. The API 220 allows a wide range of common computing functions to be written such that they may operate on many different systems, here vendors' servers $100_1$~$100_n$, PCs 300 and components of landline and wireless network systems. The media store server 200 has a catalog database 240 to store the optimized catalog by the catalog manager 210. The catalog manager 210 is a software-implemented functional component performed by the media store server 200.

The media store server 200 and the vendor's servers 1001~100n, for example, each include a data communication interface for packet data communication amongst the servers via Internet or Intranet transport. The media store server 200 and the vendor's servers 1001~100n also each include a central processing unit ("CPU"), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the functions of each particular server may be implemented in a distributed fashion on a number of similar platforms, to distribute the processing load.

The mobile handset users can access the media store platform provided by the media store server 200 via the PCs 300 through the Internet 350. In this case, as illustrated in FIG. 1, the web-based media platform is provided to the PCs 300. The web-based media platform also can be accessed by the mobile handset 450 through a wireless communication network 400. On the other hand, a pre-installed application, which is customized to the mobile handset 450, may allow the mobile handset 450 to access the media store platform through the wireless communication network 400 and enjoy the same functionalities as those provided by the web-based media store platform.

The mobile handsets 450 may take many forms. For example, some mobile handsets may be mobile telephone stations, at least some with enhanced display and user input capabilities to support browsing and other data communications applications in addition to voice telephone service. Some of these data services may be location based and require a fix on position of the mobile station. Other mobile handsets 450 may comprise Portable Digital Assistants (PDAs) with built-in wireless communication capabilities. As another alternative, a wireless device such as a mobile transceiver having data communication capabilities may be connected to a portable computing device such as a handheld or laptop type computer.

Figure 3:
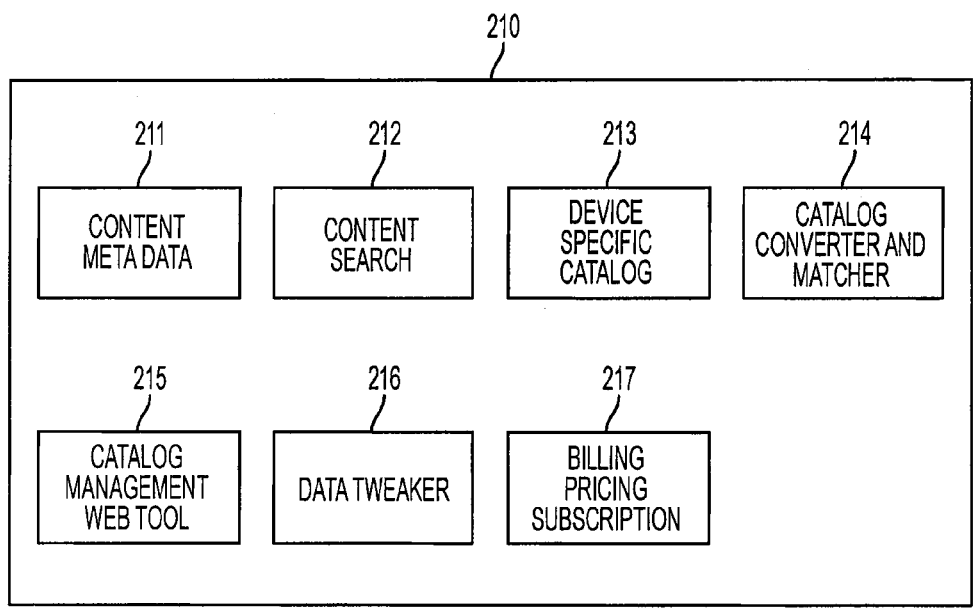
FIG. 3 is a functional diagram of the catalog manager 210 of the system of FIG. 2.

FIG. 3 is a functional diagram of the catalog manager 210 of FIG. 2. Content metadata 211 include descriptive information about attributes of data (name, size, data type etc.), structures of data (lengths, fields, etc.) and other data (location, association and ownership, etc.) in the catalog database 240. Content search module 212 is a software-implemented functional entity, execution of which causes the media store server 200 to search and obtain various music and video descriptive texts in catalogs in the plurality of the vendors' servers 1001~100n periodically or non-periodically. Device specific catalog module 213 is a software-implemented functional entity, by execution of which causes the media store server 200 to generate the web-based media store platform for the PCs 300 and generate the media store platform specific to the mobile handsets 450.

Catalog converter and matcher 214 converts descriptive texts in the catalogs obtained from the vendors' servers appropriate for the media store platform and finds and matches same music and video titles (data) in the catalogs obtained the vendors' servers based on the converted descriptive texts. One example of the converting and matching will be described in the below description of FIG. 6. The catalog converter and matcher 214 is a software-implemented functional entity of the media store server 200, by execution of which the media store server 200 performs the converting and matching operations. Catalog management web tool 215 allows media store managers to manage catalogs in the catalog database 240 and change environment (e.g. criteria for matching data in the catalog converter and matcher 214) in the media store platform. Data tweaker 216 modifies descriptive texts of music and video stored in the catalog database 240 and provides diversely categorized lists of music and video on the media store platform (e.g. rank of most downloaded music). Data tweaker 216 also pulls remote images from the vendors' servers and optimizes the images in a manner appropriate for the media store platform by using an image browser, which, for example, browses thumbnails, direct images on webpages, and icons hidden in program files. Billing, pricing and subscription module 217 deals with subscription requests from mobile handset users, billing processes after downloading of music and vide into the mobile handsets 450. The catalog management web tool 215, the data tweaker 216, and the billing, pricing and subscription module 217 are software-implemented functional components of the media store server 200, by execution of which the media store server 200 performs the above discussed respective functions.

Figure 4:
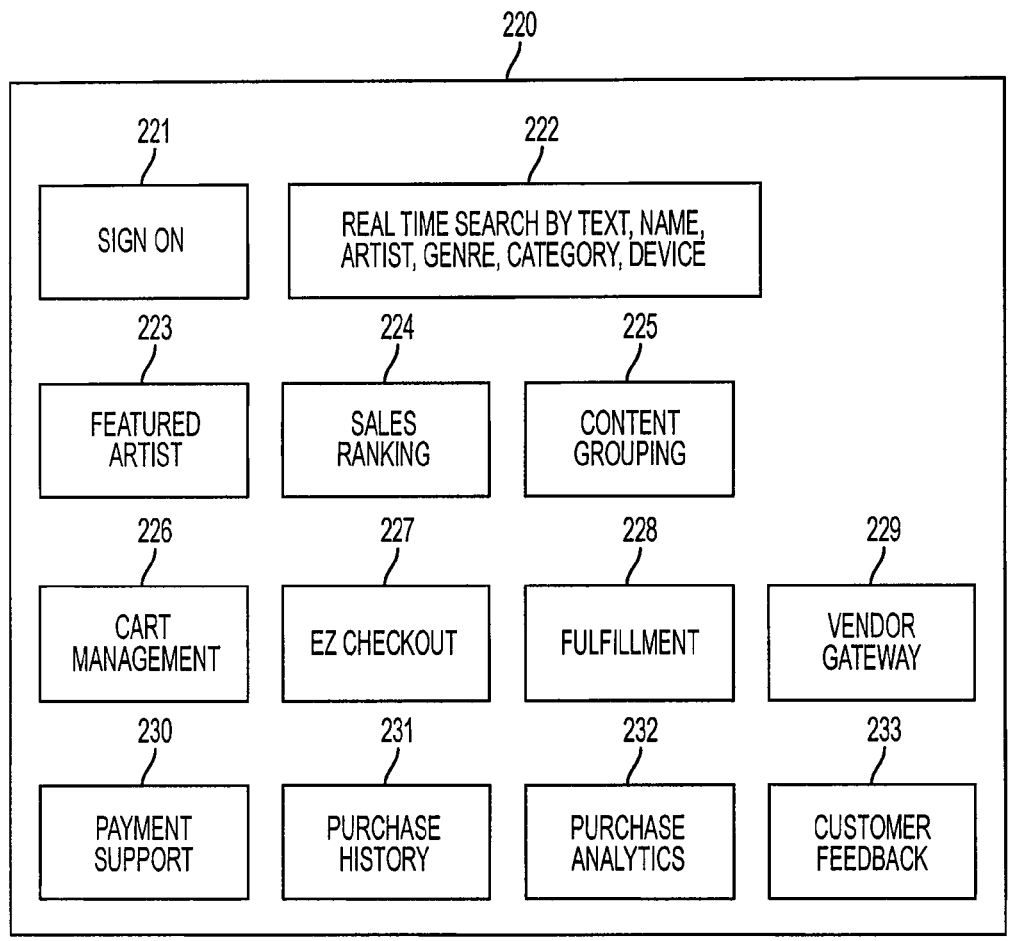
FIG. 4 is a functional diagram of the API 220 of the system of FIG. 3.

FIG. 4 is a functional diagram of the API 220 of FIG. 3. Implementation of below-discussed components of the API 220 allows the media store platform to perform diverse functionalities for interfacing with the vendors' servers 100 and mobile handsets 450 (and/or PCs 300). The sign-on module 221 deals with sign-on requests to register for the music and video download service provided by the media store platform, received from the mobile handsets 450 (or PCs 300). Real Time Search API 222 searches the catalog database 240 based on a search criteria requested by the mobile handset's 450 (or PC's 300) user, e.g. title of music and video, genre, artist, etc, upon receiving search requests sent from the mobile handsets 450 (or PCs 300), and sends the search result to the mobile handset 450 (or PC 300) that requested the search.

Figure 6:
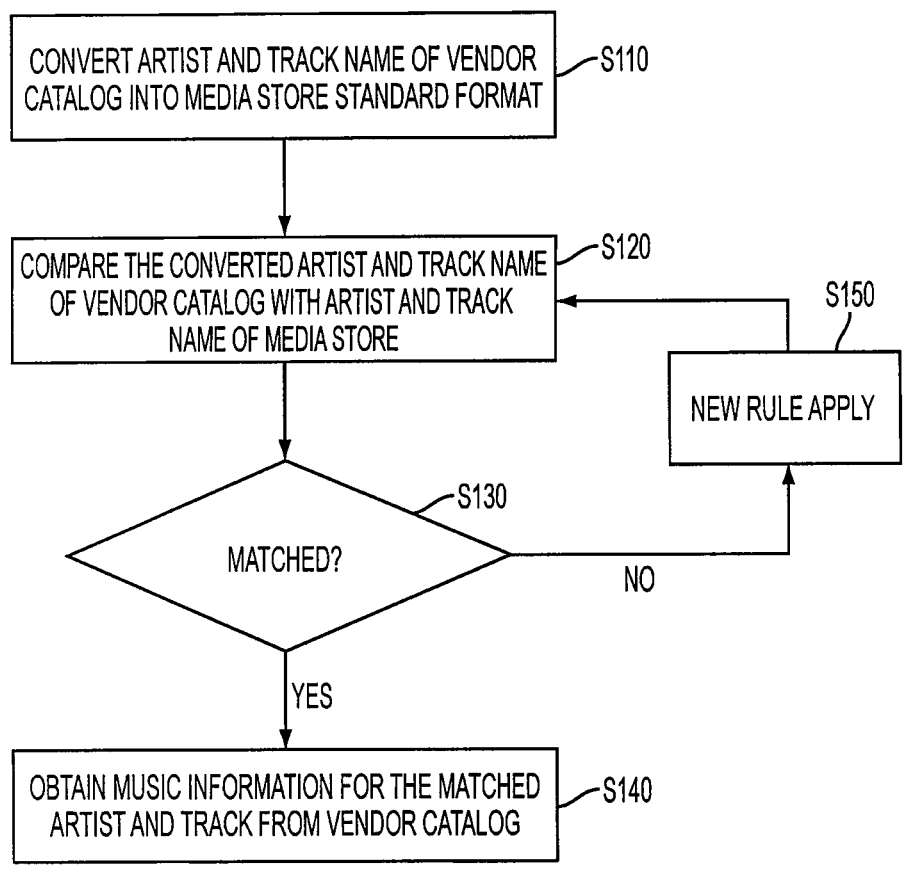
FIG. 6 is a flowchart of a process for updating track and artist names of music in the catalog of the media store server with track and artist names of the vendor's server catalog.

The catalog database 240 is updated periodically or non-periodically by the process to obtain and match descriptive texts in the plurality of vendors' catalogs disclosed in FIG. 6. Featured Artist 223 and Sales Ranking 224 APIs provide lists of featured artists and sales ranking of music and video on the media store platform. Content Grouping API 225 classifies video and music into groups according to mobile handset users' requests including grouping criteria. Cart Management API 226 allows mobile handset users to logically "put" selected music and video into a "shopping cart" during shopping via the media store website before checking out the selected music and video. EZ checkout 227 enables mobile handset users to check out the selected music and video by various payments. Fulfillment API 228 sends acknowledgement of purchasing and downloading of the selected music and video content items to the mobile handsets 450 (PCs 300) after checking out and downloading. Vendor Gateway API 229 enables the media store platform to communicate with vendors' servers 1001~100n for activities between the media store platform 1001~100n and the media store server 200. Payment Support API 230 supports prepay, in which price for downloading music and video is paid off from prepaid balance, and post-pay payment method, in which the price for downloading music and video is paid by credit card, debit card whenever the music and video is downloaded. Purchase History 231 and Purchase Analytics 232 APIs provide mobile handset users' purchase history and purchase statistics to show mobile handset users' propensity about music and video. Customer Feedback API 233 receives and aggregates feedback from users who downloaded videos and music.

Figure 5:
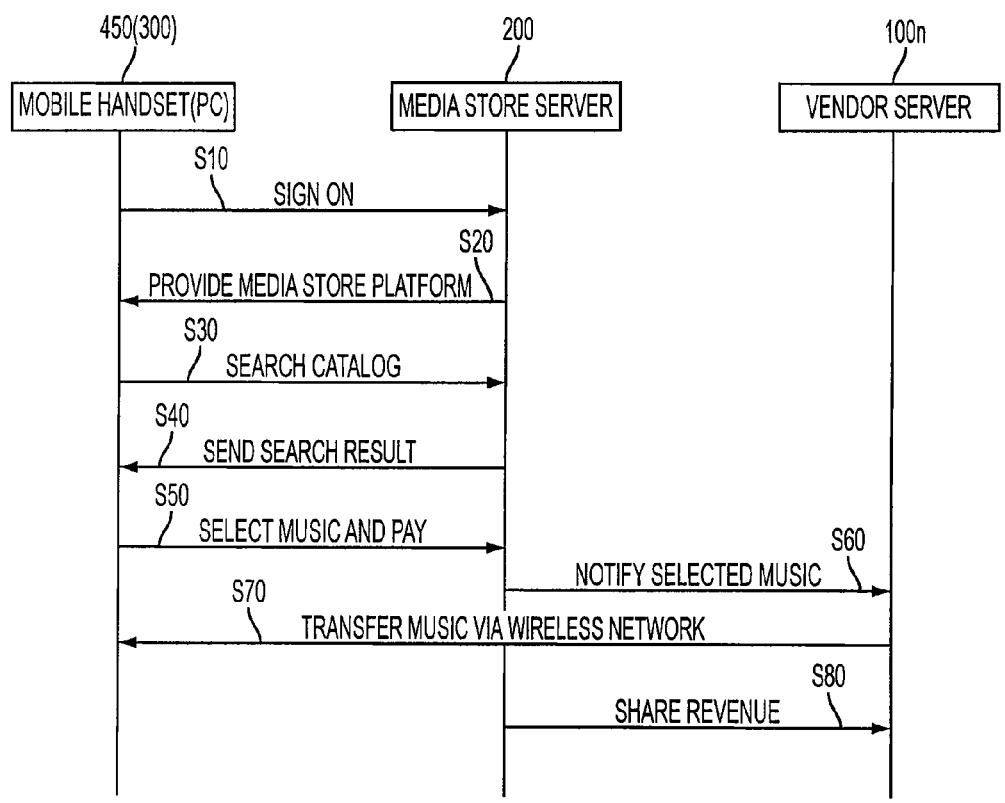
FIG. 5 is a flowchart illustrating a process performed by the media store server, the mobile handsets, and the vendor's server of FIG. 2 in downloading music.

The system of FIG. 2 may offer a variety of content types. For discussion purposes, we will assume that the content relates to music although the music related content may include other associated content, e.g. ringtone, ringback tone, music video and music related game software. FIG. 5 is a flowchart illustrating a process performed by the media store server 200, the mobile handsets 450, and a vendor 100n in downloading music (or video). A mobile handset user or a customer who wants to buy and download music or video to a mobile handset 450 accesses media store server 200 via the mobile handset 450 (or the PC 300) and signs on to get a permission to access to a media store platform provided by the media store server 200. (S10) The media store platform is an interface for users accessing the media store server 200 via the PC 300 (or mobile handset 450) to search catalog in the media store server, and purchase and request to download music, or the like.

The media store server 200 provides the media store platform to the mobile handset 450 (or PC 300) upon request to access the media store platform via the user's sign-on. In a case where the customer requested to access the media store platform via the PC 300, the webpage type media store platform is transmitted and displayed to the PC 300. (S20) When the mobile handset user requested to access the media store platform via the mobile handset, a program for media store platform compatible with pre-installed application, which may be implemented with mobile platform development applications such as JAVA and SYMBIAN, is transmitted to and executed on the mobile handset 450 to display the media store platform interface. The mobile handset user (or customer) searches music or the like by the interaction with the "SEARCH" tool in the media store platform, to find his or her desired music or video. (S30) As shown in the simplified example of FIG. 1, the mobile handset user (or customer) requests the music "Beautiful" by inputting the term "Beautiful," via selection of the menu "SEARCH." The searched term "Beautiful" is transferred to the media store server 200. The media store server 200 searches the catalog of music descriptions for descriptive texts including the searched term "Beautiful" in its catalog database 240, and sends the search result to the mobile handset 450 (or PC 300). (S40) The search result usually includes a list of a plurality of music and video, e.g. diverse versions of the same music or video and plural music and video of which the title includes the same searched term, as disclosed in FIG. 1. Similar searches and results may use other terms, such as names and/or album/collection title terms. The example used a single term for the search, although the search function also supports searching using more complex search criteria.

The mobile handset user (or customer) selects music and video to purchase among the searched result and pay the price for downloading the music or video. The mobile handset user pays the price to the media store (the wireless communication service provider) via Pre-Pay or Post-Pay method. After payment is completed, the selection is transferred to the media store server 200. (S50) The media store server 200 notifies a vendor which stores the selected music or video of the selection of the music or video by the mobile handset user (or customer). (S60) Since the selected music or video is stored in the vendors' servers 100n, the selected music is delivered from the vendor's server 100$_n$ into the mobile handset 450 via the Multimedia Messaging Service (MMS) through the wireless network. (S70) After downloading is completed, the media store server 200 shares the price for downloading with the vendor. (S80) The transactions for sharing the price is performed between the media store server 200 and the vendor billing server 150 and the transactions may be performed right after downloading or aggregated revenue for downloading music or video may be settled periodically.

Continuing with the music catalog example, FIG. 6 is a flowchart of a process for matching track and artist names in one or more of music content files listed in the catalog of the media store server with track and artist names of the vendor's server catalogs. The matching process of FIG. 6 is performed by the catalog manager 210, specifically the content search module 212 and the catalog converter and matcher of FIG. 3, which accesses and searches the vendors' catalog database and the media store's catalog database 240. In this example, while only music is discussed as a downloading object, video, game and any other multimedia applications may be matched by the below-discussed process.

The matching uses expected common information from the descriptive texts. In the example artist name and track name (or song title) are combined as a "pair" for processing. Hence in our example, the content search module 212 searches and retrieves a pair formed by artist and track name of a content file from one or more of the vendors' catalogs. The artist and track pair is one example of descriptive text for the music, and the descriptive text for the music is not limited to the artist and track names. While the search can be performed based on only artist name or only track name, in this example, the pair of artist and track names are criteria for the search and therefore are manipulated in the subsequent processing for comparison and matching.

When the retrieved pairs of artist and track names retrieved by module 212 in this process include e.g. more than one album, one pair is chosen based on a predetermined standard, for example, from the earliest album, latest Universal Product Code, etc. among the retrieved pairs of artist and track names.

The selected pair is converted to a standard format for the media store catalog. The predetermined standard may take diverse forms. In the example, the retrieved pair of artist and track names is converted into a standard format for a searchable string or key by sequential parsing or changing the artist and track names. (S110) The searchable string or key may be an unaltered original artist and track names or a converted format by diverse combinations of (a) changing to upper case, (b) removing spaces, (c) removing special characters, and (d) limiting number of characters to be compared. While the following example employs all the steps (a)-(d), the searchable string or key may be formed by using some of the steps (a)-(d), e.g. (c) and (d). While the searchable string or key may be formed by combination of the steps (a)-(d) in the initial step of matching, a new searchable string may be formed different from the initially chosen searchable string by using another combination of the steps (a)-(d) if the initially chosen searchable string does not match with artist and track names stored in the media store's catalog database 240. The new searchable string may be formed by a less restrictive method or a more restrictive method.

Each of the retrieved artist and track names in the pair is changed into the upper case. For example, if the retrieved pair of artist and track names is "Hop-and-hip and Blue's" sung by "Doctor and Doom," the track and artist names are converted to upper case, "HOP-AND-HIP AND BLUE'S," AND "DOCTOR AND DOOM." Then, to simplify the track and artist name, conventional terms included in track and artist name are removed from the track and artist name. The conventional terms coming out often in the artist and track name include items like "THE," "FEATURING," "FEAT," "FT.," "F.," "BY," and "AND." The removed conventional terms are restricted to the terms standing alone (e.g. "AND" is not removed from a non-standing alone term "CANDY."). In addition, for the simplification of the track and artist name, punctuation characters are removed from the track and artist name string. The punctuation characters include "!," "#," "-," "( )," "<" "_," etc. Spaces are also removed from the artist and track name pair. In the above example, after above conversion steps, the original artist and track names "Hop-and-hip and Blue's" and "Doctor and Doom" are converted to "HOPANDHIPBLUES," and "DOCTORDOOM." After the above conversion, the artist name and the track name are merged without space, and, in the above example, the merged artist and track name pair produces a search string or key of "HOPANDHIPBLUESDOCTORDOOM."

After the retrieved track and artist name is converted to the media store standard form ("HOPANDHIPBLUESDOCTORDOOM" in the example), the converted track and artist name string or key is compared with similar strings or keys obtained from pairs of artist and track name stored in the media store's catalog database 240 to find a match between the converted artist and track name and the converted pairs of artist and track name in the media store's catalog database 240. (S120) If a match exists between the converted artist and track name and the converted pairs of artist and track names stored in the media store's catalog database 240 (S130), the converted artist and track name is selected and the more detailed descriptive text information corresponding to the file identified by the artist and track name in the vendor's catalog is obtained, for example, including album name, artist name, genre and track name. (S140) The media store's catalog database 240 updates its catalog by recording obtained text information on the artist and track name in record of corresponding music. The converted artist and track name also may be stored for future comparison and matching.

If a match does not exist between the converted artist and track name and the pairs of artist and track name in the media store's catalog database 240 (S130), another matching method that is less exacting is implemented. (S150) For example, the number of characters used from the track name characters and the number of the artist name characters may be limited to predetermined numbers respectively. In the example, the number of track name characters and the number of artist name characters are limited to 10 and 5 respectively. The character-number limited track and artist name string in our example would be "HOPANDHIPBDOCTO." The character-number limited track and artist string (e.g. "HOPANDHIPDDOCTO") is compared with converted pairs of artist and track name in the media store's catalog database 240, of which number of characters are limited in the same way. (S120)

If a match exists between the converted artist and track name and the pairs of artist and track name in the media store's catalog database 240 (S130), descriptive text of music in the vendor's catalog corresponding to the character number restricted string are obtained. (S140) The media store's catalog database 240 updates its catalog by recording obtained the descriptive text of music on its catalog. If a match does not exist between the character-number limited artist and track name and the pairs of artist and track name in the media store's catalog database 240 (S130), a third matching method to decrease number of the track and artist names is implemented. (S150) A less restrictive method, e.g. comparing unaltered artist and track names or employing only one step (b) removing spaces or (c) removing special characters, may be used. Alternatively, a more restrictive method, e.g. may be used. For example, numbers of characters of the track and artist names are set at 8 and 4 respectively, and, in the example, the track and artist names, in our example, would become "HOPANDHIDOCT." The character number decreased string of track and artist name, "HOPANDHDOCT" is compared with the pairs of artist and track name in the media store's catalog database 240 of which number of characters are restricted in the same way (S120). As discussed above, if a match exists, the step S140 is performed. If a match does not exist, the steps S150 and S120 are performed. The new rule in the step S150 may decrease the number of artist and track names repeatedly until the match exists.

As a result of matching process of FIG. 6, the media store's catalog database 240 obtains catalog of music or the like with high accuracy, in which music are categorized accurately under correct track and artist names. The media store server stores not only original descriptive texts for the multimedia contents, but also converted standard formats, in this example, "HOPANDHIPBDOCTO," and "HOPANDHIDOCT," for future matching of other multimedia contents. The media store server 200 accesses and retrieves catalogs of vendors' server servers periodically or non-periodically to keep up with changes in vendors' catalog catalogs, and performs the matching process on retrieved descriptive texts of music or the like.

As shown by the above discussion, functions relating to the matching descriptive text of music or the like, and implementing the media store platform may be implemented on one or more computers connected for data communication via the components of a packet data network, operating as the media store server as shown in FIG. 2. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the catalog manager 210. The software code is executable by the general-purpose computer that functions as the server and/or that functions as a terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for matching and finding descriptive texts of music or the like in vendors' catalog with descriptive texts of music or the like in the media store's server, in essentially the manner performed in the implementations discussed and illustrated herein.

Figure 8:
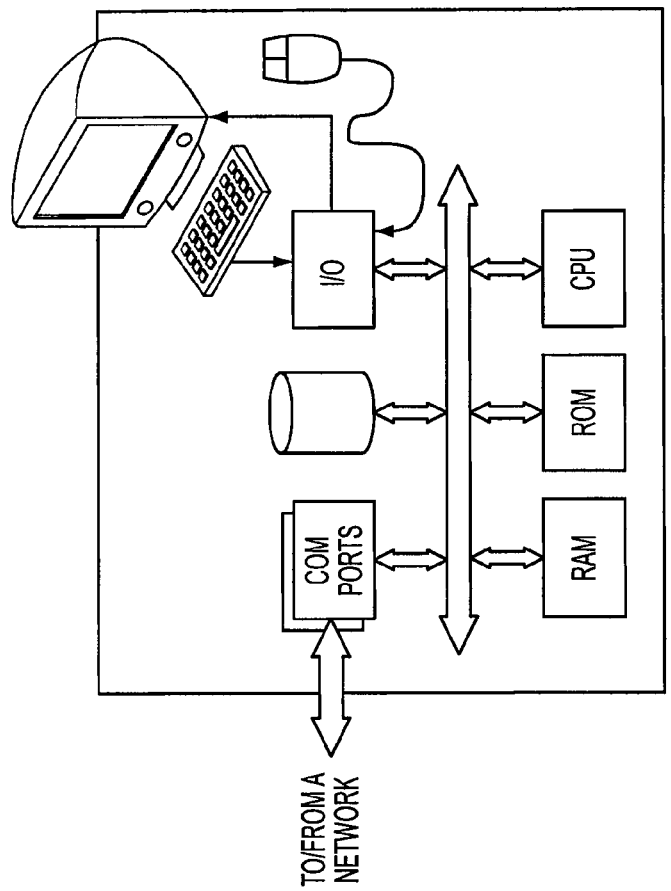
FIG. 8 depicts a computer with user interface elements, as may be used to implement a personal computer or other type of work station.
Figure 7:
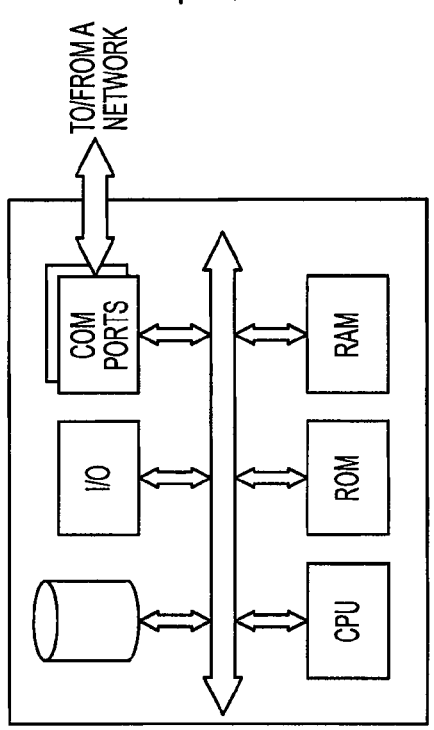
FIG. 7 illustrates a network or host computer platform, as may typically be used to implement a server.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of matching the descriptive texts of music or the like outlined above may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator into the computer platform. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the catalog manager, the API, the media store platform, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising steps of:
 (a) retrieving in a media store server a first descriptive text for multimedia content in a catalog of a vendor's server;
 (b) converting the first descriptive text for the multimedia content in the catalog of the vendor's server into a second descriptive text for the multimedia content, the second descriptive text conforming to a standardized format required by a catalog of the media store server;
 (c) comparing the second descriptive text for the multimedia content with descriptive texts for multimedia contents in the catalog of the media store server;
 (d) upon the second descriptive text for the multimedia content not matching with any of the descriptive texts for multimedia contents in the catalog of the media store server, converting the second descriptive text to a third descriptive text for the multimedia content of a decreased number of characters by removing a portion of characters of the second descriptive text;
 (e) comparing the third descriptive text for the multimedia content with the descriptive texts of multimedia contents in the catalog of the media store server, wherein the comparing of the third descriptive text is less exacting than the comparing of the second descriptive text;
 (f) storing the first descriptive text for the multimedia content of the catalog of the vendor's server in the catalog of the media store server, upon the third descriptive text for the multimedia content matching at least one of the descriptive texts for multimedia contents in the catalog of the media store server; and
 (g) providing a function for searching the catalog of the media store server, to customers' digital information devices, based at least in part on the descriptive texts for multimedia contents in the catalog of the media store server including the stored first descriptive text for the multimedia content of the catalog of the vendor's server.

2. The method of claim 1 wherein:
 the descriptive texts of multimedia contents in the catalog of the media store server compared in step (e) are texts of a decreased number of characters corresponding to the decreased number of characters of the third descriptive text.

3. The method of claim 1, wherein the steps (d) and (e) are repeatedly performed, if the second descriptive text for the multimedia content does not match with any descriptive texts for multimedia contents in the catalog of the media store server.

4. The method of claim 1, wherein the multimedia contents include music, video and game application files.

5. The method of claim 1, wherein the first descriptive text includes two or more of track information, performer or artist names, and title, actor or director names.

6. The method of claim 1, wherein the converting in step (b) includes removing conventional terms and punctuation characters in the first descriptive text.

7. The method of claim 1, wherein the step (f) includes replacing the descriptive text for the multimedia content in the catalog of the vendor's server with the descriptive text for multimedia content of the vendor's server corresponding to the matched first descriptive text.

8. A system for forming a multimedia content catalog of a multimedia store platform, for multimedia contents available to be downloaded via transactions of multimedia contents on the multimedia store platform, the system comprising:
   a media store server for providing the multimedia store platform to be displayed on digital devices of customers upon requests of the digital devices, the media store platform enabling customers transactions of the multimedia contents and storing a first multimedia content catalog including categorized descriptive texts of available multimedia contents; and
   a multimedia content vendor's server for providing a first descriptive texts for multimedia contents in a second multimedia content catalog to the media store server and storing the multimedia content, wherein:
   the media store server is configured to: convert first descriptive texts for the multimedia contents in the second multimedia content catalog of the vendor's server into respective second descriptive texts of multimedia contents, compare each respective second descriptive text for the multimedia content with descriptive texts in the first multimedia content catalog, and store one of the first descriptive texts for multimedia content of the second catalog of the vendor's server in the first catalog of the media store server in event of a respective one of the second descriptive texts for the multimedia content matching one or more descriptive texts in the first multimedia content catalog,
   the media store server is further configured to: convert a respective one of the second descriptive texts not matching with any of the descriptive texts in the first multimedia content catalog into a third descriptive text of a decreased number of characters, compare the third descriptive text with the descriptive texts in the first multimedia content catalog, and store the first descriptive text for the multimedia content of the catalog of the vendor's server corresponding to the third descriptive text in the catalog of the media store server, upon the third descriptive text for the multimedia content matching one or more with descriptive texts for multimedia contents in the catalog of the media store server,
   the second descriptive text is converted to the third descriptive text of the decreased number of characters by removing a portion of characters of the second descriptive text,
   the comparing of the third descriptive text is less exacting than the comparing of the second descriptive text; and
   the media store server is further configured to provide a function for searching the first multimedia content catalog to digital devices of customers, based at least in part on the descriptive texts for multimedia contents in the first multimedia content catalog including the stored first descriptive texts.

9. The system of claim 8, wherein
   the descriptive texts of multimedia contents in the first multimedia content catalog of the media store server compared to the third descriptive text are texts of a decreased number of characters corresponding to the decreased number of characters of the third descriptive text.

10. The system of claim 8, wherein the multimedia contents include music, video and game application files.

11. The system of claim 8, wherein each of the descriptive texts for the multimedia contents includes two or more of track information, performer or artist names, and title, actor or director names.

12. An article of manufacture, comprising:
   a non-transitory machine readable storage medium; and
   programming instructions embodied in said medium for execution by at least one computer, wherein execution causes said at least one computer to perform functions comprising:
   (a) retrieving in a media store server a first descriptive text for multimedia content in a catalog of a vendor's server;
   (b) converting the first descriptive text for the multimedia content in the catalog of the vendor's server into a second descriptive text for the multimedia content, the second descriptive text conforming to a standardized format required by a catalog of the media store server;
   (c) comparing the second descriptive text for the multimedia content with descriptive texts for multimedia contents in the catalog of the media store server;
   (d) upon the second descriptive text for the multimedia content not matching with any of the descriptive texts for multimedia contents in the catalog of the media store server, converting the second descriptive text to a third descriptive text for the multimedia content of a decreased number of characters by removing a portion of characters of the second descriptive text;
   (e) comparing the third descriptive text for the multimedia content with the descriptive texts of multimedia contents in the catalog of the media store server, wherein the comparing of the third descriptive text is less exacting than the comparing of the second descriptive text;
   (f) storing the first descriptive text for the multimedia content of the catalog of the vendor's server in the catalog of the media store server, upon the third descriptive text for the multimedia content matching at least one of the descriptive texts for multimedia contents in the catalog of the media store server; and
   (g) providing a function for searching the catalog of the media store server, to customers' digital information devices, based at least in part on the descriptive texts for multimedia contents in the catalog of the media store server including the stored first descriptive text for the multimedia content of the catalog of the vendor's server.

13. The article of manufacture of claim 12 wherein:
   the descriptive texts of multimedia contents in the catalog of the media store server compared in function (e) are texts of a decreased number of characters corresponding to the decreased number of characters of the third descriptive text.

14. The article of manufacture of claim 12, wherein the functions (d) and (e) are repeatedly performed, if the third descriptive text for the multimedia content does not match with any descriptive texts for multimedia contents in the catalog of the media store server.

15. The method of claim 1, wherein in converting the second descriptive text to the third descriptive text the order of characters of the second descriptive text does not change.

16. The method of claim 1, wherein in converting the second descriptive text to the third descriptive text characters are not added to the second descriptive text.

17. The method of claim 1, wherein, other than the removed characters, the second and third descriptive texts are the same.

18. The method of claim 1, wherein the second descriptive text is not converted to the third descriptive text if the second descriptive text matches with descriptive texts for multimedia contents in the catalog of the media store server.

19. The method of claim 1, wherein if the third descriptive text matches with descriptive texts for multimedia contents in the catalog of the media store server, storing the second and third descriptive texts in the catalog of the media store server.

20. The method of claim 1, wherein the step (d) comprises:
   determining that the second descriptive text for the multimedia content does not match with any of the descriptive texts for multimedia contents in the catalog of the media store server; and
   upon determining that the second descriptive text does not match with any of the descriptive texts in the catalog, converting the second descriptive text to the third descriptive text.

21. The method of claim 1, wherein the step (f) comprises:
   determining that the third descriptive text for the multimedia content matches at least one of the descriptive texts for multimedia contents in the catalog of the media store server; and
   upon determining that the third descriptive text matches at least one of the descriptive texts in the catalog, storing the first descriptive text in a record of a multimedia content in the catalog of the media store server which has at least one descriptive text matched to the third descriptive text.

22. The system of claim 8, wherein prior to converting a respective one of the second descriptive texts not matching with any of the descriptive texts in the first multimedia content catalog into a third descriptive text of a decreased number of characters, the media store server is configured to:
   determine that a respective one of the second descriptive texts for the multimedia content does not match with any of the descriptive texts for multimedia contents in the first multimedia content catalog; and
   upon determining that the respective one of the second descriptive texts does not match with any of the descriptive texts in the first multimedia content catalog, convert the respective one of the second descriptive texts to the third descriptive text.

23. The article of manufacture of claim 12, wherein the function (d) further comprises:
   determining that the second descriptive text for the multimedia content does not match with any of the descriptive texts for multimedia contents in the catalog of the media store server; and
   upon determining that the second descriptive text does not match with any of the descriptive texts in the catalog, converting the second descriptive text to the third descriptive text.

* * * * *